United States Patent
Ghabra et al.

(10) Patent No.: US 7,355,299 B2
(45) Date of Patent: Apr. 8, 2008

(54) NON-IGNITION SWITCH VEHICLE IGNITION ENABLING SYSTEM

(75) Inventors: Riad Ghabra, Dearborn Heights, MI (US); Bruce Banter, Northville, MI (US)

(73) Assignee: Lear Corporation, Southfield, MI (US)

( * ) Notice: Subject to any disclaimer, the term of this patent is extended or adjusted under 35 U.S.C. 154(b) by 293 days.

(21) Appl. No.: 10/604,534

(22) Filed: Jul. 29, 2003

(65) Prior Publication Data

US 2005/0023901 A1 Feb. 3, 2005

(51) Int. Cl.
*B60R 25/10* (2006.01)
*B60R 25/04* (2006.01)
*H01H 47/00* (2006.01)

(52) U.S. Cl. .................. 307/10.3; 307/10.5; 340/426.3

(58) Field of Classification Search ............... 307/10.5, 307/10.3, 10.2; 340/426.3
See application file for complete search history.

(56) References Cited

U.S. PATENT DOCUMENTS

| | | | |
|---|---|---|---|
| 4,926,332 A * | 5/1990 | Komuro et al. ............... 701/36 |
| 5,117,097 A * | 5/1992 | Kimura et al. ............... 235/439 |
| 5,689,142 A | 11/1997 | Liu | |
| 5,745,026 A * | 4/1998 | Kokubu et al. ........ 340/286.01 |
| 5,774,043 A * | 6/1998 | Mizuno et al. ........ 340/426.35 |
| 5,818,330 A | 10/1998 | Schweiger | |
| 5,836,187 A * | 11/1998 | Janssen et al. ................. 70/252 |
| 5,862,691 A * | 1/1999 | Friedrich et al. ............. 70/264 |
| 5,874,785 A | 2/1999 | Liu | |
| 5,965,955 A * | 10/1999 | Takanohashi ............... 307/10.5 |
| 6,095,415 A | 8/2000 | Shouji | |
| 6,386,447 B1 | 5/2002 | Proefke et al. | |
| 6,400,254 B2 * | 6/2002 | Yamamoto et al. .......... 340/5.6 |
| 6,703,721 B1 * | 3/2004 | Kito .......................... 307/10.3 |
| 6,958,551 B2 * | 10/2005 | Janssen ..................... 307/10.3 |
| 2004/0046453 A1 * | 3/2004 | Hayashi et al. ............ 307/10.5 |

\* cited by examiner

*Primary Examiner*—Michael Sherry
*Assistant Examiner*—Michael Rutland-Wallis
(74) *Attorney, Agent, or Firm*—Earl LaFontaine

(57) ABSTRACT

An active keyed locking system (10) for a vehicle (12) includes a keyed actuated device (58). A position sensor (56) is coupled to the keyed device (58) and generates a position signal indicative of position of the keyed device (58). A controller (64) is electrically coupled to the position sensor (56) and enables a vehicle component in response to the position signal.

20 Claims, 4 Drawing Sheets

NON-IGNITION SWITCH VEHICLE IGNITION ENABLING SYSTEM

BACKGROUND OF INVENTION

The present invention relates to vehicle ignition enabling systems. More particularly, the present invention relates to a system and method of enabling ignition within a vehicle without use of an ignition switch.

Various types of locks have been used in connection with door locking mechanisms and ignition systems of a vehicle. Traditionally, vehicle door locking mechanisms and ignition systems have operated utilizing a mechanical key. Vehicle operators have used a key in locking or unlocking vehicle doors and in rotating an ignition start, such as an ignition system tumbler, to start a vehicle.

Recently developed active and passive systems are used in replacement of or to operate in conjunction with the traditional mechanical keyed systems. Active systems refer to systems that require some sort of action by an operator in order to actuate a locking or start mechanism. An example of an active system is one that uses a remote control to remotely access or start a vehicle, such as those utilizing a keyfob. Passive systems, typically, include an authorization device, such as a smart card, which has a coded signal. An operator merely needs to be within a predetermined range of the vehicle and a vehicle controller checks the coded signal on the authorization device before allowing access thereto.

The active and passive systems may include anti-theft and anti-tampering mechanisms, which are incorporated to deter unauthorized access to and ignition starting of a vehicle. An example of a device that is considered both an anti-theft device and an anti-tampering device is an electronic interlock. An electronic interlock uses a coded activation signal to enable access to or starting of a vehicle.

Similar to the smart card system described above, anti-theft systems often include an access device, such as a key or card having a transmitter that transmits an authorization signal. The authorization signal is received by a vehicle controller, which verifies the authorization signal and allows locking mechanisms to be actuated or vehicle ignition to be enabled.

It has been determined that vehicle operators tend to prefer and have a significant comfort level associated with the use of an active system having a key style mechanism. The comfort level stems from the perceived concept that there exists a higher level of security when a key must be used to access or operate a vehicle rather than simply using a remote or wireless access device. This preference exists even when a higher level of security actually exists for the remote or wireless access device.

Ignition start mechanical keyed systems typically include a lock assembly having a tumbler that receives a key and is rotated to activate an ignition switch. In operation, an ignition key is inserted into the tumbler, an authorization code may be verified, and the key is than rotated switching the ignition switch to an ignition "ON" state. The tumbler can be complex and costly. Also, the ignition switch can be large in size and costly, depending upon the amount of current passing therethrough.

Other than the traditional turn key style active ignition system there also exists a non-turn key style active ignition system. In a non-turn key system a key is inserted into a lock assembly, an authorization code is verified, and a separate push button is depressed to enable or start the vehicle ignition. The push button when depressed either activates an ignition switch or generates an activation signal that is received by a controller in turn starting the engine ignition. Non-turn key systems are generally less preferred due to a lack of rotation of a key and the conventional tactile feel accompanying that rotation.

It is desirable in designing vehicle systems to minimize the number of components contained therein as well as to minimize system size, weight, and complexity. Thus, there exists a need for an improved active keyed locking system that minimizes system size, weight, and complexity.

SUMMARY OF INVENTION

The present invention provides an active keyed locking system for a vehicle that includes a keyed actuated device. A position sensor is coupled to the keyed device and generates a position signal indicative of position of the keyed device. A controller is electrically coupled to the position sensor and enables a vehicle component in response to the position signal.

One of several advantages that is provided by several embodiments of the present invention is the provision of an active turn key locking system without the need for an ignition switch or a key tumbler. In so doing, the present invention minimizes size, cost, and complexity of an active keyed locking system.

Another advantage provided by an embodiment of the present invention is the provision of an active keyed locking system that not only eliminates the need for an ignition switch, but also provides key authorization to deter theft or unwarranted access to a vehicle. Furthermore, the present invention is versatile in that it may be applied to various lock assemblies and ignition systems.

Furthermore, it is yet another advantage of an embodiment of the present invention to provide an active keyed locking system with the above-stated advantages that also provides a conventional tactile feel when actuating a key and lock assembly contained therein.

The present invention is versatile in that it may be applied to various lock assemblies and ignition systems.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein:

FIG. 11 is a front cross-sectional view of a lock assembly having multiple magnetic structures in accordance with another embodiment of the present invention; and.

DETAILED DESCRIPTION

Figure 1:
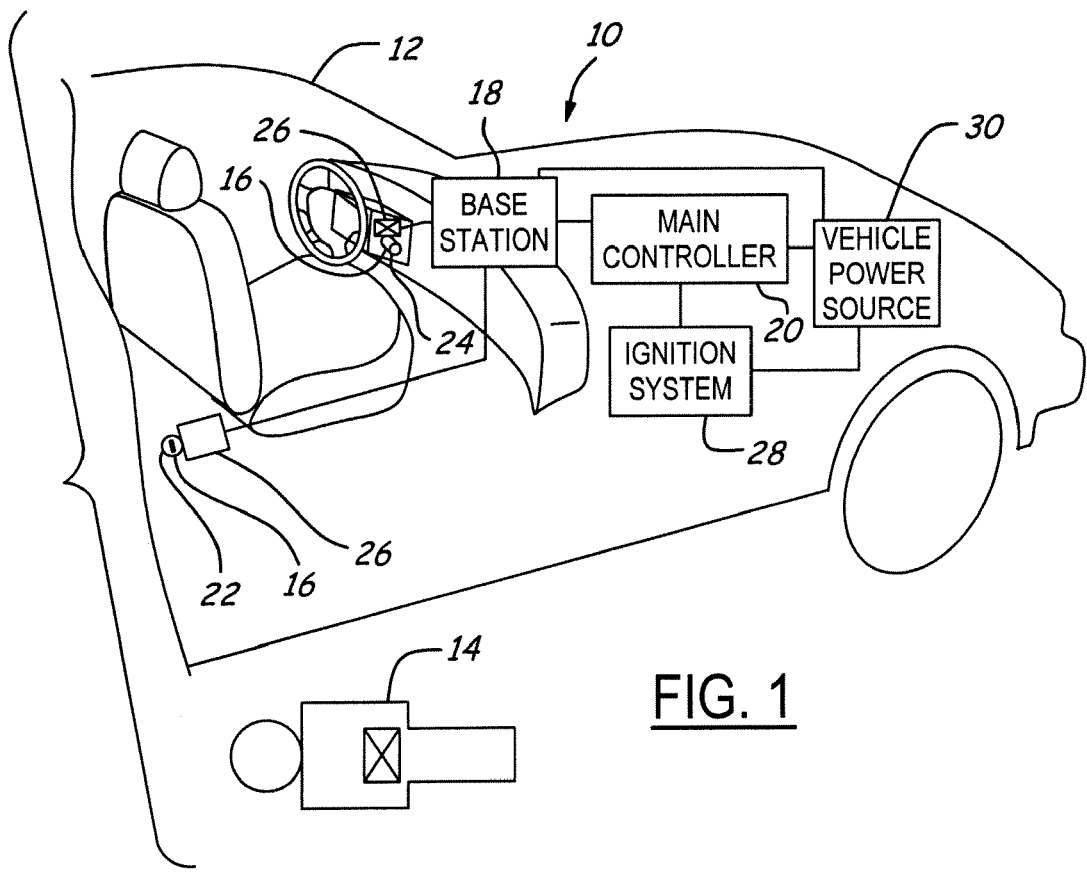
FIG. 1 is a perspective and block diagrammatic view of an active keyed locking system for a vehicle in accordance with an embodiment of the present invention.

In the following figures the same reference numerals will be used to refer to the same components. While the present invention is described with respect to a system and method of enabling ignition within a vehicle without use of an ignition switch, the present invention may be adapted and applied in various locking assemblies and systems including ignition systems, door locking systems, as well as other active keyed locking system applications. The present invention may be applied to trunks, hoods, glove compartments, storage units, ignition start devices, and other devices that have a lock assembly.

In the following description, various operating parameters and components are described for one constructed embodiment. These specific parameters and components are included as examples and are not meant to be limiting.

Although for simplicity, the following description is primarily directed to an active keyed locking system as applied to an ignition start or ignition lock assembly, the present invention as stated above may be applied to various other lock assemblies known in the art.

Also, in the following description the term "vehicle component" may refer to any component or system of components within a vehicle. For example, a vehicle component may refer to a stereo, an air-conditioning system, one or more lights, an ignition system, a lock, a seat system, an overhead console, or other various components or systems within a vehicle.

Additionally, the term "key" refers to any access, unlocking, or component-starting device that may or may not have a specific identity. A specific identity may be an authorization code, a cut pattern, a magnetic field of a predetermined strength, or other identification parameter known in the art. A key may be active, such that it generates a transmission signal or magnetic field. A key may be passive such that it simply has a specific cut pattern, size, length, style, reflective pattern, bar code, or other passive identification or authorization parameter known in the art. A key may be a keyfob with an insertable portion that may be inserted into a lock assembly. A key may be of various sizes, shapes, styles, and forms as are known in the art. A few examples of a key are provided in the following description.

Referring now to FIG. 1, a perspective and block diagrammatic view of an active keyed locking system 10 for a vehicle 12 in accordance with an embodiment of the present invention is shown. The active system 10 includes one or more keys 14 (only one is shown), one or more lock assemblies 16, one or more base stations 18 (only one is shown), and a main controller 20. Further examples of keys are shown in FIGS. 3-10. The lock assemblies 16, in the embodiment as shown, include a door lock assembly 22 and an ignition lock assembly 24. The base station 18 enables access to or ignition of one or more vehicle components upon identification, authorization, and position determination of the keys 14. Position sensors 26 are coupled between the lock assemblies 16 and the base stations 18. The lock assemblies 16 may be located within the base stations 18.

For example, the lock assemblies 16 may have any number of rotational or translational positions, each position corresponding to an activation of one or more vehicle components. Upon inserting and actuating the keys 14 in one of the lock assemblies 16 the base stations 18 identify, authorize, and determine the position of the keys 14. When the keys 14 have been authorized the main controller 20 enables one or more vehicle components in response to the key positions. The keys 14 may even be in the form of a toggle switch having several different positions, such that the keys, upon being inserted into the lock assemblies, may be toggled into the different positions. For simplicity, the present invention is primarily described with respect to rotationally actuated keys and lock assemblies, although other actuatable keys and lock assemblies may be used.

The base stations 18 may generate an ignition signal that is received by the main controller 20, which in turn starts the ignition of an ignition system 28. The base stations 18, the main controller 20, and the ignition system 28 receive power from a vehicle power source 30.

Figure 7:
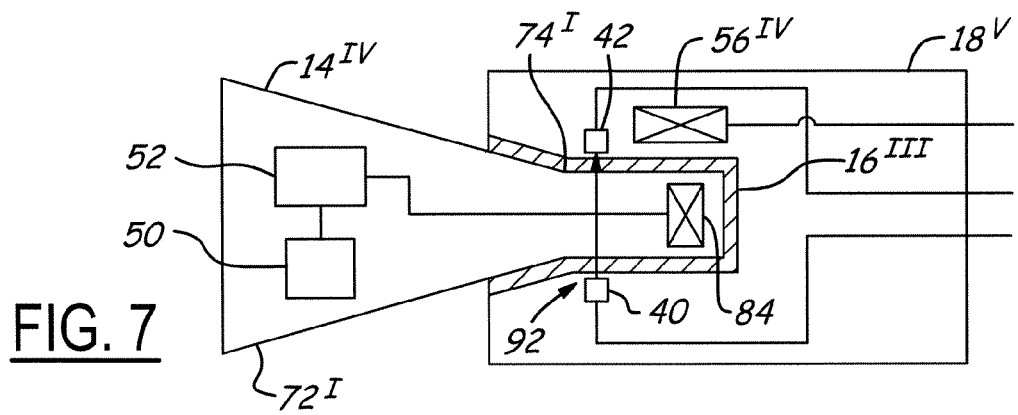
FIG. 7 is a cross-sectional view of a key and a corresponding base station utilizing a key recognition assembly in accordance with another embodiment of the present invention.

The active system 10 may utilize various techniques in identifying and authorizing the keys 14. For identification the active system 10 may utilize an infrared transmitter 40 and an infrared detector 42, as shown in FIG. 7. The activation system 10 in identifying a key may also utilize various switches, magnetic field sensors, or other sensors or identification techniques known in the art. For authorization the active system 10 may utilize various modulation or coded signal techniques known in the art, such as the coded technique described with respect to FIG. 2.

In the following Figures various alternative examples are provided for the keys 14, the lock assemblies 16, and the base stations 18.

Figure 2:
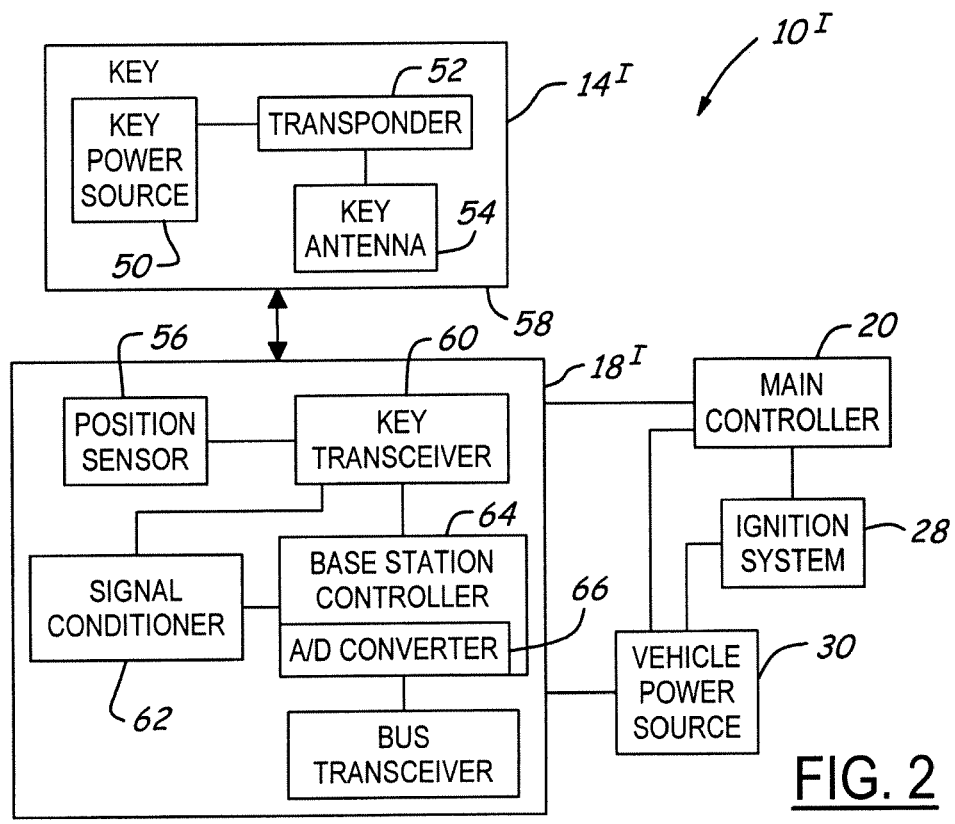
FIG. 2 is a block diagrammatic view of an active keyed locking system in accordance with an embodiment of the present invention.

Referring now to FIG. 2, a block diagrammatic view of an active keyed locking system 10' in accordance with an embodiment of the present invention is shown. The active system 10' includes a key 14' and a base station 18'. In the embodiment of FIG. 2, the key 14' is an active key and transmits an authorization signal as well as a position field-altering signal to the base station 18'. The base station 18' verifies the authorization signal and upon verification determines the position of the key 14' in response to the position field-altering signal. The base station 18' in response to the position of the key 14' enables vehicle components, such as accessories or ignition of the ignition system 28.

The key 14' may include a power source 50, a transponder 52, and a key antenna 54. The power source 50 may be in the form of a capacitor, a battery, or other power source known in the art. The power source 50 may have energy stored therein or may receive energy from an electric field generated by the base station $18^I$. In general, the power source 50 is not necessary for position detection of the key $14^I$. The transponder 52 is used for detection and transmission of authorization signals as well as transmission of position field-altering signals between the key $14^I$ and the base station $18^I$. The key antenna 54 may be in the form of a conductive coil or in some other antenna form known in the art.

Figure 4:
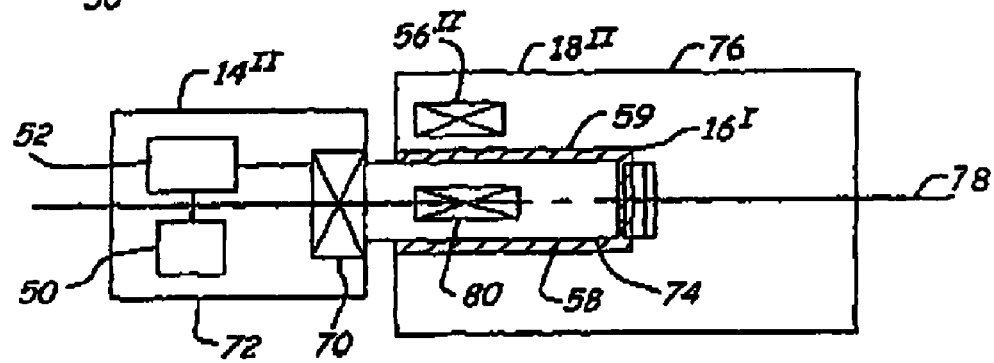
FIG. 4 is a cross-sectional view of the key of FIG. 3 and a corresponding base station in accordance with another embodiment of the present invention.

The base station $18^I$ includes a position sensor 56 for sensing rotational position of a keyed rotationally actuated device 58, such as the key $14^I$ or a key lock assembly component, and generates a position signal in response thereto. An example of a key lock assembly component is a key insert 59, which is shown in FIG. 4. A key transceiver 60 is coupled to the position sensor 56 and is used in reception and generation of the authorization signals, as well as in reception of the position signals.

In one embodiment of the present invention, a signal conditioner 62 and a base station controller 64 are coupled to the transceiver 60. The signal conditioner 62 may include amplification and rectification circuitry (not shown). The controller 64 receives the authorization signals directly from the transceiver 60 and receives the position signals via the signal conditioner 62 through an analog-to digital converter 66. The authorization signals are in a digital format whereas the position signals are in an analog format. Of course, the authorization signals and the position signals may be in various formats known in the art. Upon authorization and appropriate ignition position enablement of the key $14^I$, the base station controller 64 generates an ignition signal. The ignition signal is received by the main controller 20, which in turn starts ignition within the ignition system 28.

Figure 9:
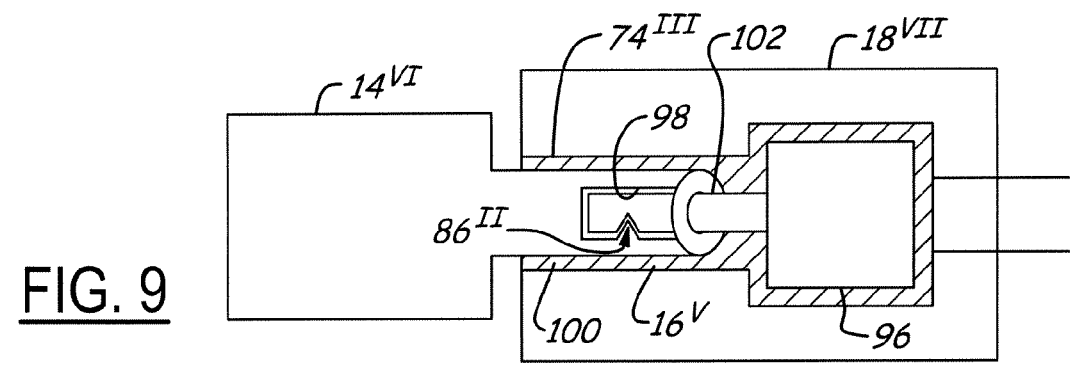
FIG. 9 is a cross-sectional and perspective view of a key and a corresponding base station having a potentiometer/encoder style position sensor in accordance with another embodiment of the present invention.

The position sensor 56 may be of various type and style known in the art. The position sensor 56 may be in the form of one or more antennas, such as one or more conductive coils. The position sensor 56 may be infrared based, electromagnetic based, resistive or current based, or based on some other sensing technique known in the art. The position sensor 56 may be in the form of a series of magnets, a coil, a potentiometer, an encoder, an optical sensor, an infrared sensor, a hall effect sensor, a rotary variable differential transformer, a rotary variable inductance transducer, an angular position sensor, or a resolver, as is shown in FIG. 9.

The main controller 20, the transponder 52, and the base station controller 64, may be microprocessor based such as a computer having a central processing unit, memory (RAM and/or ROM), and associated input and output buses. The main controller 20, the transponder 52, and the base station controller 64 may be application-specific integrated circuits or may include other logic devices known in the art. The main controller 20 and the base station controller 64 may be a portion of a central vehicle main control unit, an interactive vehicle dynamics module, or may be stand-alone controllers as shown.

Figure 3:
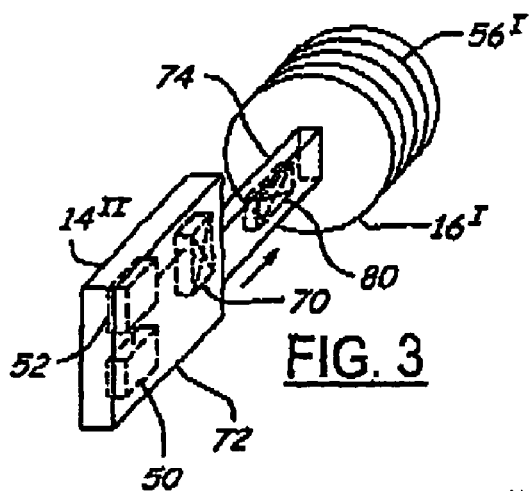
FIG. 3 is a perspective view of a key, having a key cylinder non-insertable antenna, and a lock assembly utilizing a single coil configuration in accordance with an embodiment of the present invention.

Referring now to FIGS. 3 and 4, perspective and cross-sectional views of a key $14^{II}$, having a key cylinder non-insertable antenna 70, a lockset or lock assembly $16^I$, and a base station $18^{II}$ utilizing a single coil configuration in accordance with an embodiment of the present invention are shown. The key cylinder non-insertable antenna 70 is located within a body section 72 and not within an insertable section 74 of the key $14^{II}$. Position sensors $56^I$ and $56^{II}$ may be in the form of conductive coils, as shown, or may be in some other form, as is further stated below. The position sensor $56^I$ resides around the lock assembly $16^I$, whereas the position sensor $56^{II}$ resides within a base station $18^{II}$ and in close proximity to the insert 59.

As the key $14^{II}$ is rotated about the axis 69, which extends therethrough, a magnetic field generated by the position sensors $56^I$ and $56^{II}$ directly changes corresponding to the rotational position of the key $14^{II}$. For example, the transponder 52 may generate a modulation signal that is transmitted by the key antenna 70. As the key $14^{II}$ is rotated, magnetic field generated by the position sensors $56^I$ and $56^{II}$ is affected by the modulation signal, which causes change in amplitude of the magnetic field. The change in the magnetic field is detected by the transceiver 60. In another example, a base signal in the form of a modulated magnetic field is generated by the position sensors $56^I$ and $56^{II}$ and is altered by the proximate positioning and translating of the key antenna 54. Position of the key $14^{II}$ is determined in response to the alteration of the base signal.

The key insert 59 resides within the base station $18^{II}$ and is rotationally translatable relative to a base station housing 76. A resistive element 78, such as a spring or the like, may be coupled between the insert 59 and the base station housing 76 to provide a traditional rotational tactile feel to the key $14^{II}$ during actuation thereof. The resistive element 78 may be mechanical or electrical in nature. The element 78 is illustrated in FIG. 4. Other known resistive elements may be used in replacement of or in combination with the resistive element 78.

In another embodiment of the present invention the key $14^{II}$ does not have the key antenna 70, but rather simply a field-altering device 80, such as a magnetic device, located within the insertable section 74. The position sensors $56^I$ and $56^{II}$ are used to generate a magnetic field. As the key $14^{II}$ is rotated, the field-altering device 80 alters the magnetic field generated by the position sensors $56^I$ and $56^{II}$, thereby, indicating position of the key $14^{II}$. The field-altering device 80 may be formed of a ferrous material or other magnetic material known in the art.

Figure 5:
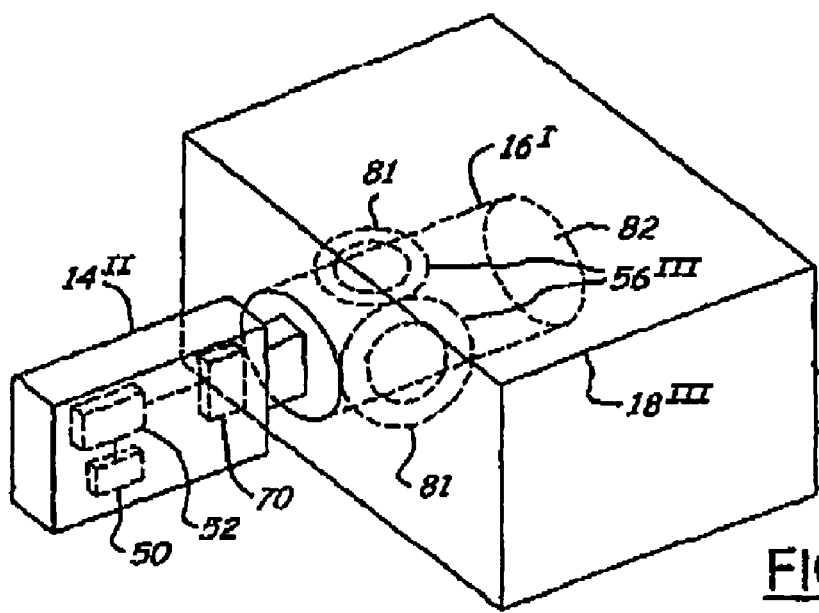
FIG. 5 is a perspective view of a key and a corresponding base station utilizing a dual coil configuration in accordance with another embodiment of the present invention.

Referring now to FIG. 5, a perspective view of a key $14^{II}$ and corresponding base station $18^{III}$ utilizing a dual coil configuration in accordance with another embodiment of the present invention is shown. The base station $18^{III}$ includes a position sensor $56^{III}$ in the form of a pair of antennas or coils 81, each of which being mounted on a side 82 of the lock assembly $16^I$. The coils 81 are mounted approximately 90° relative to each other. The dual coils 81 are used, as opposed to a single coil, to increase rotational position differentiation. Magnetic field differences between the coils 81 may be monitored and interpolation may be performed therebetween to better determine position of the key $14^{II}$. Any number of coils may be utilized.

Figure 6:
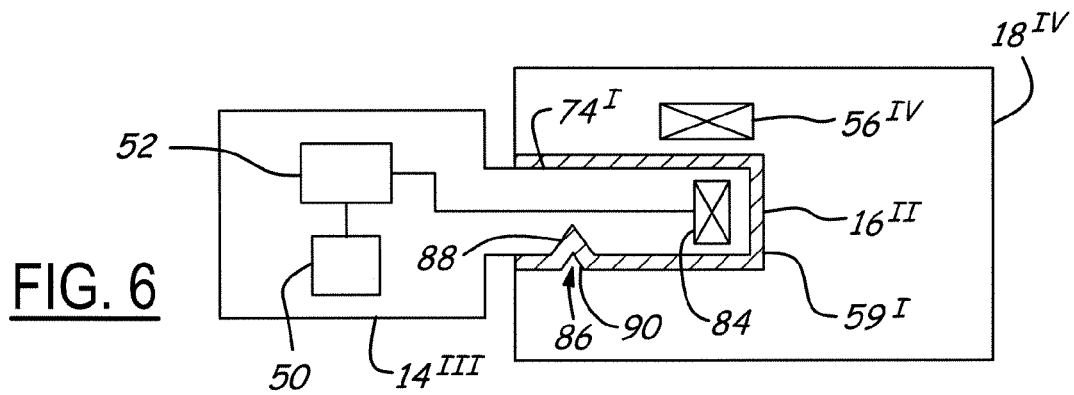
FIG. 6 is a cross-sectional view of a key having a key cylinder insertable antenna, a corresponding base station, and a key locking device in accordance with another embodiment of the present invention.

Referring now to FIG. 6, a cross-sectional view of a key $14^{III}$ having a key cylinder insertable antenna 84, and a corresponding base station $18^{IV}$ with a key locking device 86 in accordance with another embodiment of the present invention is shown. The insertable antenna 84 is located within an insertable section $74^I$. By having the insertable antenna 84 within the insertable section $74^I$, amplitude changes within the magnetic field that are generated by the transceiver 60 are increased, in effect increasing the position differentiation capability of the active system 10. The insertable section $74^I$ and the base station $18^{IV}$, in combination, provide the locking device 86. The locking device 86 may be in various forms known in the art. The locking device 86 may include a detent 88, within the insertable section $74^I$, and a protruding member 90. The protruding member 90 may extend from an insert 59" into the detent 88, as shown.

The locking device 86 may also include other components to lock the key 14$^{III}$ in a position relative to a lock assembly 16$^{II}$, such as a spring, a plunger, a latch, or other locking device components known in the art. The locking device 86 may also be used for key identification, an example of which is provided by the embodiment of FIG. 8.

The position sensor 56$^{IV}$ is located within the base station 18$^{IV}$ such that it is in direct alignment with the insertable antenna 84, when inserted in the lock assembly 16$^{II}$. The direct alignment of the position sensor 56$^{IV}$ with the insertable antenna 84 provides increased position signal differentiation and thus increased position differentiation of the key 14$^{III}$. Additional example embodiments illustrating alignment between key antennas or insertable antennas and position sensors are shown in FIGS. 7 and 8.

Referring now to FIG. 7, a cross-sectional view of a key 14$^{IV}$ and a corresponding base station 18$^{V}$ utilizing a key recognition assembly 92 in accordance with another embodiment of the present invention is shown. A lock assembly 16$^{III}$ includes the infrared transmitter 40 and the infrared receiver 42. When the key 14$^{IV}$ is inserted into the key assembly 16$^{III}$ infrared light passing between the transmitter 40 and the receiver 42 is affected, allowing the base station controller 64 to recognize or identify the key 14$^{IV}$. Upon recognition of the key 14$^{IV}$ the base station controller 64 initiates operation of the active system 10. The transmitter 40 and the receiver 42 may also be used in authorization of the key 14$^{IV}$ through use of various techniques known in the art.

Note that a body and an insertable section of a key may be of various sizes, shapes, and styles; another example of which is illustrated by the body 72$^{I}$ and the insertable section 74$^{I}$ of the key 14$^{IV}$. Similarly, a lock assembly and a base station may also be of various sizes, shapes, and styles to accommodate for the various sizes, shapes, and style keys.

Figure 8:
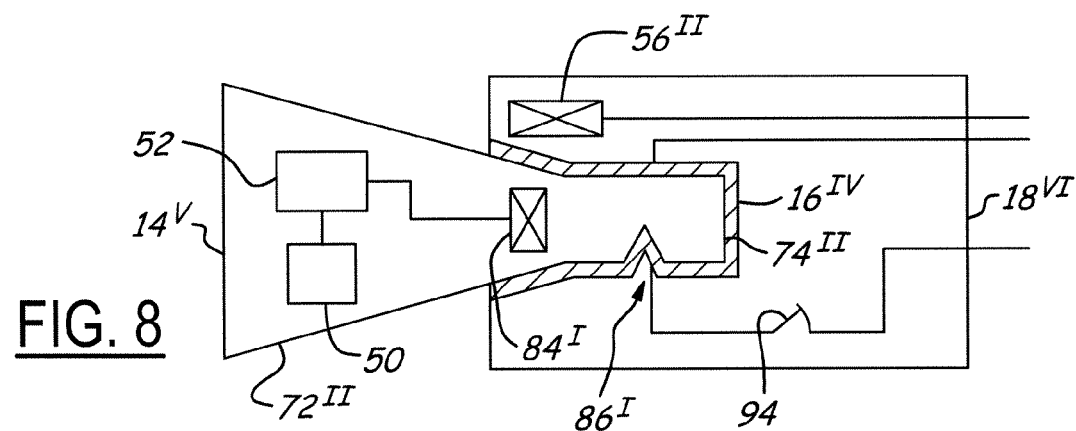
FIG. 8 is a cross-sectional view of a key having a body mounted key cylinder insertable antenna, a corresponding base station, and a key locking device in accordance with another embodiment of the present invention.

Referring now to FIG. 8, a cross-sectional view of a key 14$^{V}$ having a body mounted key cylinder insertable antenna 84$^{I}$, and a corresponding base station 18$^{VI}$ with a key locking device 86$^{I}$ in accordance with another embodiment of the present invention is shown. The insertable antenna 84$^{I}$ is located within a body 72$^{II}$ rather than within an insertable section 74$^{II}$ of the key 14$^{V}$, as with insertable antenna 84 of FIG. 7. As stated above, the position sensor 56$^{II}$ is located within the base station 18$^{VI}$ and is in direct alignment with the insertable antenna 84$^{I}$ when the key 14$^{V}$ is inserted into a lock assembly 16$^{IV}$.

The locking device 86$^{I}$ may be in various forms. The locking device 86$^{I}$ is coupled to a recognition switch 94. The recognition switch 94 is in an "ON" position when the key 14$^{V}$ is inserted into the lock assembly 16$^{IV}$. The base station controller 64 is coupled to the switch 94. The base station controller 64 activates operation of the active system 10 in response to the state of the switch 94.

Referring now to FIG. 9, a cross-sectional and perspective view of a key 14$^{VI}$ and corresponding base station 18$^{VII}$ having a potentiometer/encoder style position sensor 96 in accordance with another embodiment of the present invention is shown. Insertable section 74$^{III}$ of the key 14$^{VI}$ is cylindrically shaped having an inner surface 98 and an outer surface 100. The position sensor 96 resides within a lock assembly 16$^{V}$ and has a rotational member 102 that extends from the potentiometer/encoder 96. The insertable section 74$^{III}$ slides over the rotational member 102 and locks thereto via a key locking device 86$^{II}$. As the key 14$^{VI}$ is rotated, position of the key 14$^{VI}$ is determined in response to a position signal generated by the position sensor 96. The position signal may be generated using various potentiometer and encoder position measuring techniques known in the art.

Figure 10:
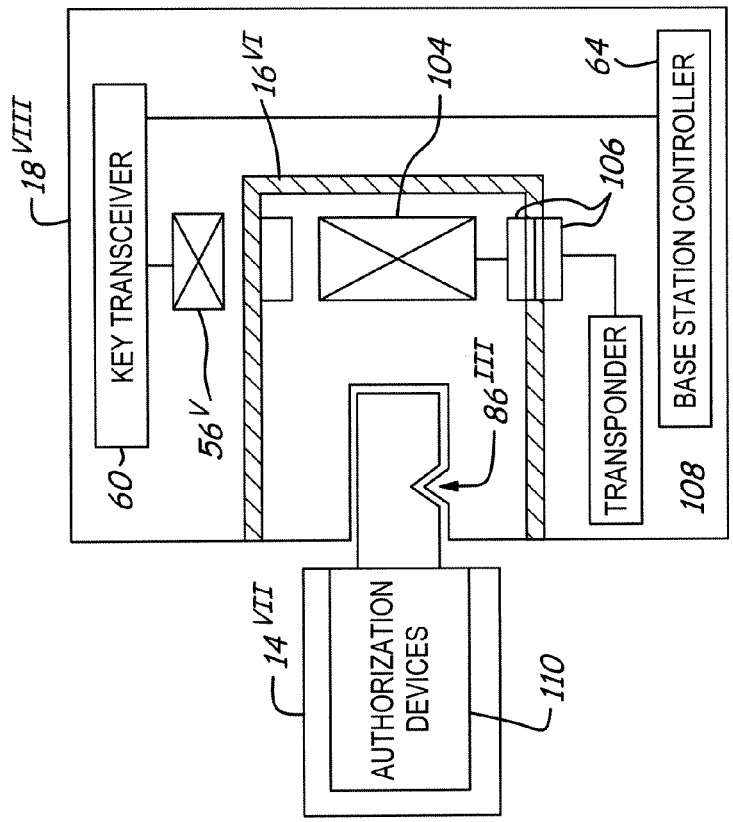
FIG. 10 is a cross-sectional view of a key and a corresponding base station having a key antenna within a lock assembly in accordance with another embodiment of the present invention.

Referring now to FIG. 10, a cross-sectional view of a key 14$^{VII}$ and a corresponding base station 18$^{VIII}$ with a key antenna 104 in accordance with another embodiment of the present invention is shown. A lock assembly 16$^{VI}$ includes the key antenna 104 as opposed to the key antenna 104 being located within the key 14$^{VII}$. Therefore, the key 14$^{VII}$ is passive with respect to the position related components. All active position determination related components are located within the lock assembly 16$^{VI}$ and the base station 18$^{VIII}$. The key 14$^{VII}$ may include the authorization devices 110, such as the transponders and the key antennas described above, for key authorization.

The lock assembly 16$^{VI}$ in combination with the key 14$^{VII}$ provide a key locking device 86$^{III}$, such that when the key 14$^{VII}$ is inserted into the lock assembly 16$^{VI}$ they are locked or fixed in relative position to each other. The lock assembly 16$^{VI}$ rotates simultaneously and in unison with the key 14$^{VII}$. Thus, by rotating the key 14$^{VII}$ one also rotates the lock assembly 16$^{VI}$ and the key antenna 104 contained therein. Rotation of the key antenna 104 alters a position signal generated by a position sensor 56$^{V}$.

A pair of contacts 106 exists for electrical coupling between the key antenna 104 and a transponder 108 or the like, which is located within the base station 18$^{VIII}$. The transponder 108 may be similar to the transponder 52 or may be coupled to or incorporated in the base station controller 64.

Figure 11:
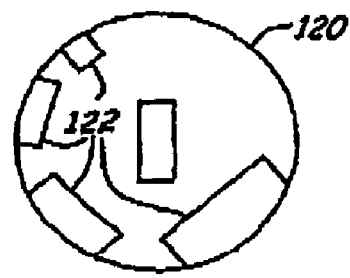

Referring now to FIG. 11, a front cross-sectional view of a lock assembly 120 having multiple magnetic structures 122 in accordance with another embodiment of the present invention is shown. In determining position of a key, various signal modulation techniques may be used including amplitude modulation, frequency modulation, phase modulation, and other modulation techniques known in the art or a combination thereof. The embodiment of FIG. 11 is directed towards a frequency modulation technique.

As a key is rotated after being inserted into the lock assembly 120, due to varying size and/or magnetic field strength of the magnetic structure 122, frequency of a position signal is altered. The variance in frequency may be detected and since the amount of frequency variation is directly proportional to the rotational position of the key, the key position may be determined. The frequency modulation technique described above is just one possible frequency modulation example, other frequency modulation techniques may be utilized.

The magnetic structures 122 may have varying magnetic field strength and varying size and length. The magnetic structures may be formed of various magnetic materials known in the art.

Figure 12:
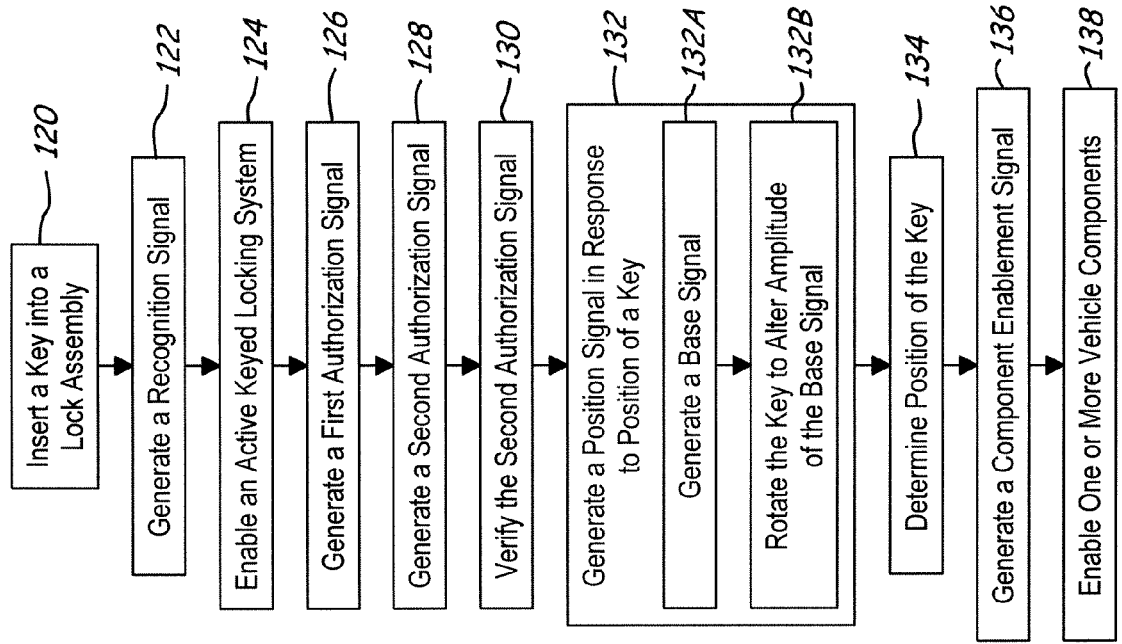
FIG. 12 is a logic flow diagram illustrating a method of enabling at least one vehicle component through use of an active keyed locking system in accordance with an embodiment of the present invention.

Referring now to FIG. 12, a logic flow diagram illustrating a method of enabling at least one vehicle component through use of the active system 10 in accordance with an embodiment of the present invention is shown. Although the following steps are described with respect to the embodiments of FIGS. 2-8, the steps may be easily modified to be applied to other embodiments of the present invention.

In step 120, the key 14$^{I}$ is inserted into a lock assembly 16. In step 122, a recognition device, such as the transmitter 40 and the receiver 42 or the switch 94 of FIGS. 7 and 8, generates a recognition signal. In step 124, the base station controller 64 in response to the recognition signal enables the active system 10 including the base station 18$^{I}$ and the components contained therein.

In step 126, the base station controller 64 signals the transceiver 60 to generate a first authorization signal. In one embodiment of the present invention the first authorization signal is in the form of a modulated carrier signal. In step 128, the transponder 52 in response to the first authorization signal generates a second authorization signal. In step 130, the base station controller 64 verifies the code of the second authorization signal with that of a predetermined code, which may be stored within the base station controller 64. When the second authorization code is deemed correct the base station controller 64 proceeds to step 132.

In step 132, the position sensor 56 generates a position signal in response to the rotational position of the key 14¹. A position sensor may determine position of a lock assembly, as described with respect to the embodiment of FIG. 10. In step 132A, the transceiver 60 generates a base signal, such as a modulated signal or a magnetic field. In step 132B, the key antenna 54 may be rotated altering the base signal; the change in amplitude forms the position signal. The base signal may be altered in amplitude, frequency, phase, by some other signal parameter known in the art, or by any combination thereof.

In one embodiment of the present invention, the lock assembly has three rotationally selectable positions. When the key 14¹ is in a first position, corresponding to non-enablement of any vehicle components, amplitude of the position signal is at a minimal level. When the key 14¹ is in a second position, corresponding to enablement of vehicle accessories, amplitude of the position signal is at a midlevel. When the key 14¹ is in a third position, corresponding to enablement of ignition within the ignition system 28, amplitude of the position signal is at a maximum level.

In step 134, the base station controller 64 monitors change, such as change in amplitude or frequency, in the base signal or the position signal and in response thereto determines rotational position of the key 14¹. In step 136, the base station controller 64 generates a component enablement signal, which is received by the main controller 20. In step 138, the main controller 20 enables one or more vehicle components, such as for example enablement of ignition within the ignition system 28, in response to the component enablement signal.

The above-described steps are meant to be illustrative examples; the steps may be performed sequentially, synchronously, simultaneously, or in a different order depending upon the application.

The present invention provides an active keyed locking system that eliminates the need for a key tumbler and an ignition switch, as are traditional used in prior active locking systems. Although the present invention eliminates the use of a key tumbler and an ignition switch it provides a traditional tactile feel and resistance in regards to key actuation. The active keyed locking system of the present invention is simple in design, minimizes number of system components, lightweight, and inexpensive to manufacture.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An active keyed locking system for a vehicle, said system comprising:
   a base station for being mounted onboard said vehicle;
   a lock assembly located within said base station and including both an infrared transmitter and an infrared receiver;
   a fixed position sensor located both within said base station and about said lock assembly for statically generating a magnetic field;
   a keyed actuated device including a field-altering device for altering said magnetic field when inserted into said lock assembly and placed proximate to said fixed position sensor; and
   a controller electrically coupled to said fixed position sensor;
   wherein said base station is operable to identify said keyed actuated device with said infrared transmitter and said infrared receiver, said fixed position sensor is operable to generate a position signal indicative of the rotational position of said keyed actuated device based on alteration of said magnetic field, and said controller is operable to enable at least one vehicle component in response to said position signal.

2. A system as in claim 1, wherein said keyed actuated device is a key lock assembly component comprising a key insert.

3. A system as in claim 1, wherein said keyed actuated device is a key.

4. A system as in claim 3, wherein said key includes a signal generator for generating a transmission signal.

5. A system as in claim 3, wherein said field-altering device comprises ferrous material.

6. A system as in claim 3, wherein said field-altering device comprises a magnetic device.

7. A system as in claim 3, wherein said key includes:
   an antenna coil; and
   a transponder coupled to said antenna coil for generating a transmission signal.

8. A system as in claim 3, wherein said key includes a transponder for generating an authorization signal, and said controller is operable to enable at least one said vehicle component in response to said authorization signal.

9. A system as in claim 1, wherein said fixed position sensor comprises at least one structural form selected from the group consisting of a series of magnets, a coil, a potentiometer, an encoder, an optical sensor, an infrared sensor, a hall effect sensor, a rotary variable differential transformer, a rotary variable inductance transducer, an angular position sensor, and a resolver.

10. A system as in claim 1, wherein said fixed position sensor is coupled between said lock assembly and said base station.

11. A system as in claim 1, wherein at least one said vehicle component comprises at least one structure selected from the group consisting of a vehicle accessory, an ignition, a door lock, and a vehicle system.

12. A system as in claim 1, wherein said infrared transmitter and said infrared receiver are operable to generate a recognition signal, and said base station is operable to enable said active keyed locking system in response to said recognition signal.

13. A system as in claim 1, wherein said keyed actuated device is a key, and said key includes a key antenna.

14. An ignition-enabling system for a vehicle, said system comprising:
   a base station for being mounted onboard said vehicle;
   a lock assembly located within said base station and including both an infrared transmitter and an infrared receiver;

a fixed position sensor located both within said base station and about said lock assembly for statically generating an electric field;

an identifiable key having a transponder and engageable with said lock assembly such that rotation of said key within said lock assembly enables said transponder to alter said electric field; and a controller electrically coupled to said fixed position sensor;

wherein said base station is operable to identify said key with said infrared transmitter and said infrared receiver, said fixed position sensor is operable to generate a position signal indicative of the rotational position of said key based on alteration of said electric field, and said controller is operable to enable at least one vehicle component in response to said position signal.

15. A method of enabling at least one vehicle component through use of an active keyed locking system, said method comprising the steps of:

(a) statically generating a magnetic field using a fixed position sensor;

(b) rotating a keyed actuated device within said magnetic field, wherein said keyed actuated device includes a field-altering device;

(c) identifying said keyed actuated device with both an infrared transmitter and an infrared receiver;

(d) monitoring alterations in said magnetic field using said fixed position sensor;

(e) determining the rotational position of said keyed actuated device using a position signal generated by said fixed position sensor, wherein said position signal changes in response to said alterations in said magnetic field; and (f) enabling at least one said vehicle component in response to said position signal.

16. A method as in claim 15, wherein step (c) comprises the steps of:

recognizing a key and also generating a recognition signal; and enabling said active keyed locking system in response to said recognition signal.

17. A method as in claim 16, wherein step (c) further comprises the step of activating a base station in response to said recognition signal.

18. A method as in claim 15, wherein said method further comprises the steps of:

generating a first authorization signal;

generating a second authorization signal in response to said first authorization signal;

verifying said second authorization signal; and generating said position signal in response to verification of said second authorization signal.

19. A method as in claim 15, wherein step (e) comprises the steps of:

generating at least one base signal;

altering said at least one base signal via actuation of said keyed actuated device; and generating said position signal in response to alteration of said at least one base signal.

20. A method as in claim 19, wherein at least one said base signal is modulated using at least one modulation technique selected from the group consisting of amplitude modulation, frequency modulation, and phase modulation.

* * * * *